United States Patent [19]

Kuk et al.

[11] Patent Number: 4,997,477

[45] Date of Patent: Mar. 5, 1991

[54] URANIUM SILICIDE DISPERSION FUEL UTILIZING RAPID SOLIDIFICATION BY ATOMIZATION

[75] Inventors: Il H. Kuk; Chang K. Kim; Chong T. Lee, all of Daejeon, Rep. of Korea

[73] Assignee: Korea Advanced Energy Research Institute, Chungnam, Rep. of Korea

[21] Appl. No.: 435,873

[22] Filed: Nov. 14, 1989

[51] Int. Cl.$^5$ .............................................. C22B 60/00
[52] U.S. Cl. ........................................ 75/338; 75/331; 75/334; 75/352; 75/355; 75/255; 420/3; 148/132; 148/401
[58] Field of Search ............... 75/331, 338, 344, 352, 75/355, 255; 420/3; 148/132, 401

[56] References Cited

U.S. PATENT DOCUMENTS 4,023,992  5/1977  Ross ............................................. 420/3
4,812,166  3/1989  Saiki et al. ................................. 75/346

Primary Examiner—Stephen J. Lechert, Jr.
Attorney, Agent, or Firm—Armstrong, Nikaido, Marmelstein, Kubovcik & Murray

[57] ABSTRACT

Producing finely divided $U_3Si$ by supercooling a melt of uranium and silicon at a high cooling rate of $10^3$ to $10^{7°}$ C./sec.

4 Claims, 2 Drawing Sheets

URANIUM SILICIDE DISPERSION FUEL UTILIZING RAPID SOLIDIFICATION BY ATOMIZATION

This invention is directed to fine particle dispersions of uranium silicide. It more particularly refers to a novel method of making such fine particles.

BACKGROUND OF THE INVENTION

A heat-treated billet of $U_3Si$ has a hardness of about 200 VPN, a ductility of 1%, a compressibility of about 20% at room temperature, and is too tough to be crushed or comminuted easily.

Until now, a milling machine or a lathe was used for coarse comminution to chips, or a large press (over 200 tons) was used for crushing. Chips of $U_3Si$ are highly combustible due to its high oxidation receptive characteristics. Thus, it is necessary to machine comminute under a sufficient amount of cutting fluid to substantially prevent oxidation. Impurities gather in chippings from the cutting fluid, which necessitates rinsing and drying as extra processes. In addition, crushing by means of a large press carries with it the danger of fire, and a safety facility is needed to protect the environment from fumes and/or fine air-borne particles. Coarse particles crushed in presses also include impurities introduced from the press die, which requires further rinsing and drying.

Pulverizing the chips into fine particles is usually done in a hammer mill, impact mill, shatter box, or vibration mill. In any case, impurities are gathered from the part of each machine which is worn by the collision of the high speed comminuted particles. This equipment should be surrounded by argon or nitrogen since the fine particles of uranium alloys may explosively oxidize in open air.

During comminution, heavy, complicated equipment is needed, along with a series of tedious and laborious processes. Ferrous impurities, mainly due to the wear of machine parts, are suitably removed by magnetic separation. Very often, the uranium fuel components are removed at the same time since the particles containing ferrous components often carry some uranium with them. This introduces inefficiencies in fabrication and necessitates a waste treatment process for the magnetically separated particles. It is concluded that if possible, comminution by these techniques should be avoided.

The chemical composition of a cast ingot differs as a function of position in the ingot. $U_3Si$ alloys are melted and cast in high frequency induction furnaces or in arc furnaces. The microstructure of the cast ingot shows typical dendrites when the cooling rate is fast. The matrix formed is uranium containing silicon up to its solubility level with $U_3Si_2$ dendrites as the primary phase. As the cooling rate becomes slower, the primary $U_3Si_2$ phase transforms to a particle shape, showing faceting planes. Such ingots show a great negative compositional segregation of about ±0.1% silicon such that the silicon is higher in concentration in the upper portion of the ingot than it is in the lower portion. Furthermore, the silicon content varies microscopically due to dendritic growth. These microscopic and macroscopic segregations affect the following peritectoid heat treatment and the homogeneity of fuel components produced therefrom.

The cast ingot contains microstructures of $U_3Si_2$ and $U_{ss}$ (uranium matrix with solution of silicon up to solubility) as mentioned above. $U_{ss}$ is a harmful material in the reactor, due to hot spot effects and dimensional instability. $U_3Si_2$ is stable but has a lower loading density than $U_3Si$. The ingot structure of $U_3Si_2$ and $U_{ss}$ is therefore changed into $U_3Si$ by a heat-treatment as shown below.

$$U_3Si_2 + U_{ss} \rightarrow 2 \, U_3Si \text{ (peritectoid reaction)}$$

In conventional processes, this takes 72 hours at 800° C. This can be shortened if powders are heat-treated because of the larger surface area of powders. It was verified by the inventor that the degree of the peritectoid reaction in a powder heat-treatment depends on the compositional homogeneity of each powder. This compositional homogeneity is increased up to its maximum by this invention.

SUMMARY OF THE INVENTION

This invention comprises the production of fine uranium silicide powders by rapidly cooling a melt of an alloy of uranium and silicon at about $1,000(10^3)$ to $10,000,000(10^7)$ C/sec.

DETAILED DESCRIPTION OF THIS INVENTION

Figure 1:
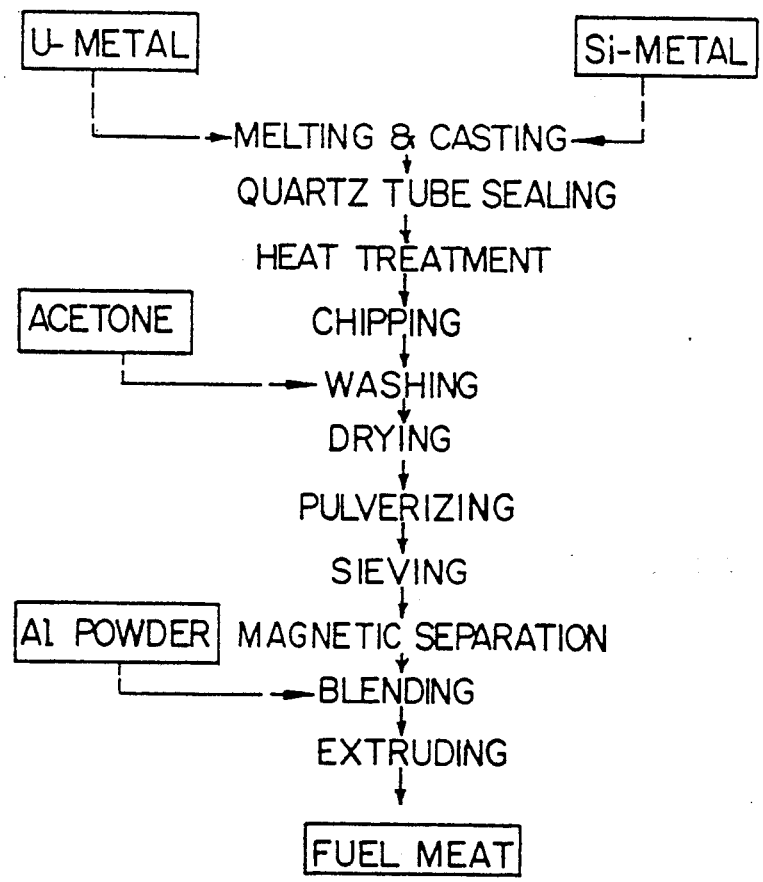
FIG. 1 is a flow sheet of a process conventionally used to comminute uranium silicide into five particles.
Figure 2:
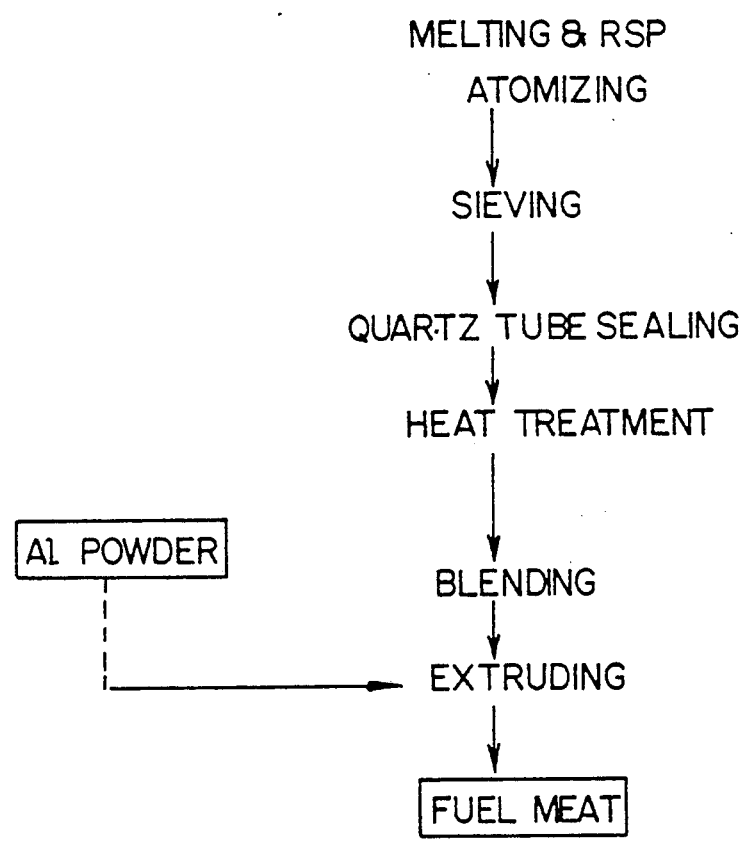
FIG. 2 is a flow sheet of the process of this invention. The drawing is self explanatory.

This invention is concerned with the fabrication of uranium silicide dispersion nuclear fuel which is used in research and materials testing reactors. Atomized particles having rapidly solidified structures are obtained directly from a melt of uranium and silicon without comminution or pulverization. This process, which includes subsequent heat-treatment, reduces much of the complication of long fabrication processes while increasing the quality of the fuel.

$U_3Si$ is the material of the highest loading density among the candidate fuel materials developed so far for research and test reactors. Currently, the fuel used in the reactor is composed of $U_3Si$ particles, dispersed in a matrix of aluminum to ameliorate the effects of poor thermal conductivity and poor mechanical properties characteristic of $U_3Si$. $U_3Si$ is not obtained directly by casting. The phase of the cast ingot consists of $U_3Si_2$ and uranium in solid solution ($U_{ss}$). The primary particles of $U_3Si_2$ and $U_{ss}$ react together to form $U_3Si$, over a long period of time and at a high temperature. The heat-treated billets of $U_3Si$ are comminuted, blended with aluminum particles, and then used as nuclear fuel. In practice, heat-treated billets do not comminute easily, since the $U_3Si$ is tougher than the $U_3Si_2$ Moreover, comminution is a tedious and complicated process, requiring safety precautions from airborne radioactive powder. Additionally, it introduces an additional requirement for the removal of impurities, i.e., rinsing, drying and magnetic separation of ferrous impurities. This invention produces $U_3Si$ powders directly from an alloy melt by rapid cooling (cooling rates of $10^3$–$10^7$ °C./sec) and atomization. By this technique, supercooled $U_3Si$ particles can be obtained and the complicated comminution processes can be avoided. Furthermore, rapidly cooled and atomized $U_3Si$ is more uniform in composition, and appears to upgrade the performance of nuclear fuel made therefrom.

In this invention, a molten alloy of uranium and silicon is atomized directly into a powder as it is cooled rapidly at $10^3°-10^7°$ C./sec. The following are the merits obtained by this technique.

First, comminution by pulverizing is no longer a necessary part of the overall process, and accordingly, rinsing, drying and ferrous material separation become unnecessary because fewer impurities are introduced. In this manner, high purity uranium silicide with very low impurity levels is obtained. High process efficiency is achieved, eliminating unnecessary processes and concommittant loss of fuel material.

Second, the powders obtained by the process of this invention are highly homogeneous in alloy composition. The microstructures of these powders are either super saturated or amorphous, both of which are more stable in reactor performance than the saturated crystalline alloys. Rapidly cooled supersaturated alloys have very fine grains, finely dispersed precipitates and solutions which are supersaturated. Alloys subdivided by rapid cooling at even high cooling rates have amorphous structures, which are highly corrosion resistant due to the low local electrochemical potential caused by the disappearance of grain boundaries. Furthermore, the alloy is very stable to neutron irradiation due to isotropy. Rapidly cooled alloys will not form dendrites, nor have micro- or macro-segregation of the alloy components. This enables the powder produced therefrom to be heat-treated in any batch size due to its high homogeneity.

Third, atomization by rapid solidification from a melt can speed up the peritectoid reaction. In conventionally processed ingots, 72 hours at 800° C. is needed to transform all the $U_3Si_2$ to $U_3Si$. With atomized powders made according to this invention, less than 24 hours is needed at the same temperature for the same transformation. Another benefit is that the twin structure is eliminated, which improves reactor performance.

What is claimed is:

1. A process of producing finely divided uranium silicide which comprises forming an alloy of uranium and silicon; melting said alloy; and rapidly cooling said alloy under conditions sufficient to atomize such into fine particles of $U_3Si$.

2. The process claimed in claim 1 wherein said alloy is of $U_3Si_2$ and uranium solid solution.

3. The process claimed in claim 1 including cooling at a rate of about $10^3$ to $10^7°$ C. per second.

4. The process claimed in claim 2 including heat treating said fine particles to an extent sufficient to cause $U_3Si$ to be formed.

* * * * *